United States Patent [19]
Breitweg

[11] Patent Number: 5,769,121
[45] Date of Patent: Jun. 23, 1998

[54] ROTARY SLIDE VALVE FOR POWER-ASSISTED STEERING IN MOTOR VEHICLES

[75] Inventor: Werner Breitweg, Bargau, Germany

[73] Assignee: ZF Friedrichshafen AG., Friedrichshafen, Germany

[21] Appl. No.: 809,837
[22] PCT Filed: Sep. 18, 1995
[86] PCT No.: PCT/EP95/03657
  § 371 Date: Mar. 21, 1997
  § 102(e) Date: Mar. 21, 1997
[87] PCT Pub. No.: WO96/09200
  PCT Pub. Date: Mar. 28, 1996

[30] Foreign Application Priority Data

Sep. 21, 1994 [DE] Germany ............. 44 33 599.7

[51] Int. Cl.[6] ........................................ F15B 9/10
[52] U.S. Cl. ................... 137/625.23; 29/890.128; 91/375 A; 180/423
[58] Field of Search ............ 91/375 A; 137/625.23; 180/423; 29/890.128

[56] References Cited

U.S. PATENT DOCUMENTS 5,135,068 8/1992 Emori et al. .............. 91/375 A X
5,575,193 11/1996 Bareis et al. .............. 91/375 A Primary Examiner—Gerald A. Michalsky
Attorney, Agent, or Firm—Larson & Taylor

[57] ABSTRACT

A rotary slide valve (1) for the power steering of motor vehicles contains a rotary distributor (4) in a valve bore (5) of a valve housing (2), which distributor is connected with a valve inlet member (23). A control bushing (7) is rotatably guided over a small angle in an axial bore (6) of the rotary distributor (4). The control bushing (7) is fixedly connected to prevent relative rotation, with a valve outlet member (18). A centering device (31) is disposed between the rotary distributor (4) and the valve outlet member (18), and contains two parts which can be rotated in respect to each other, and at least one ball (37) situated between the two parts. The one part of the centering device (31) is fixedly connected with a reaction piston (32) and fixedly connected with the rotary distributor (4) against relative rotation, but is axially displaceable. The other part of the centering device (31) is fixedly connected with the valve outlet member (18) to prevent relative rotation and nondisplaceable in a predetermined position. The ball (37) is maintained in recesses (35, 36) of the two elements. In this rotary slide valve the centering device (31) can be set in respect to its centering force and its exact center position independently from the setting of the hydraulic center between the rotary distributor (4) and the control bushing (7).

9 Claims, 2 Drawing Sheets

ROTARY SLIDE VALVE FOR POWER-ASSISTED STEERING IN MOTOR VEHICLES

BACKGROUND OF THE INVENTION

1. Field of the Invention

The invention relates to a rotary slide valve for the power steering of motor vehicles in accordance with the present invention. The rotary slide valve contains two valve parts which are arranged to be coaxially movable inside each other and are maximally rotatable in respect to each other about the rotational travel path of a backlash coupling. In this case the first valve element, which is connected with a valve inlet member, is externally embodied as a radial rotary distributor. The second valve element is fixedly connected to prevent relative rotation, with a valve outlet member and is located inside as a radial control bushing, which is guided in an axial bore of the rotary distributor. Both valve elements have longitudinal control ports which are at least partly limited in their axial length and cooperate with each other for the control of a pressure medium into and out of two work chambers of a servo motor. A torsion bar is used to reset the two valve elements from a deflected position into their neutral position.

2. Description of the Prior Art

A rotary slide valve of this type is the subject of DE-A1-43 10 396. This rotary slide valve has the advantage that it is possible to keep the exterior size of the entire valve very small by means of the special arrangement of the control bushing in the interior of the rotary distributor. Centering of this rotary slide valve is performed exclusively via the torsion bar. A torsion bar is known to have the property that the reset in the central area of the rotary slide valve by the torsion bar is very small.

In connection with other rotary slide valves it has therefore been proposed to provide a centering device in addition to the torsion bar, which allows very exact centering, particularly in the direct central area of the rotary slide valve. Such an additional centering device is known, for example, from DE-C1 42 01 311. In this embodiment the additional centering device requires additional structural space in the axial direction. However, the essential disadvantage is that this middle centering device can no longer be adjusted after the individual parts have been manufactured. Because of this, large differences in the middle of the central area and in the torque are possible. Since the centering spring is supported on the one end on a rotating element and on the other end on a stationary one, additional friction is created which influences the sensitivity of the rotary slide valve.

The object of the invention is therefore based on equipping the known rotary slide valve with an additional adjustable middle centering device which does not cause any additional friction between the two valve elements.

SUMMARY OF THE INVENTION

This object is attained by means of the rotary slide valve of the present invention. Advantageous embodiments of the invention are recited in the dependent claims. A method for mounting the rotary slide valve in accordance with the invention is described herein.

The solution is that a spring-loaded centering device is located between the rotary distributor and the valve outlet member of the rotary slide valve of the type, which contains two elements which can be rotated with respect to each other, and with at least one ball situated between the two elements. As a result, one part is fixedly connected with a reaction piston, and is fixedly connected with the rotary distributor to prevent relative rotation, but is axially displaceable. The other part is fixed to the outlet element in a predetermined position to prevent relative rotation and prevent axial displacement. The ball is maintained in the recesses of the two elements.

Because of the placement of the centering device between the rotary distributor and the valve outlet member, a part of the centering device can be fixed in a predetermined position to the valve outlet member. Because of this the centering device can be easily adjusted with respect to the centering position and centering force even after manufacturing of the individual parts. By means of the arrangement of the centering device between the externally located slide valve and the valve outlet member, it is also possible to support the spring acting on the reaction piston on the rotary distributor. Since the reaction piston rotates together with the rotary distributor, there is no relative movement between the two places where the spring is attached, so that there is no friction there.

The other part of the centering device, which is connected with the valve outlet member, suitably consists of an easily produced ring piece, which has a V-shaped recess on one of its front faces. The ring piece and the valve outlet member are drilled together in a predetermined position and the ring piece is fixedly connected with the valve outlet member by means of a stud. To simplify mounting and secure the position during the operation of the rotary slide valve, the ball is kept inside a plastic cage. The spring, which is supported with one end on the reaction piston and the other end on a stop disposed on the rotary distributor, for example a snap ring, is suitably embodied as a form spring in the manner of a plate spring. It is possible by means of this to realize an exactly metered centering force and a very short structural length.

The invention will be explained in detail below by means of an exemplary embodiment represented in the drawings. As shown:

DETAILED DESCRIPTION OF THE PREFERRED EMBODIMENT

Figure 1:
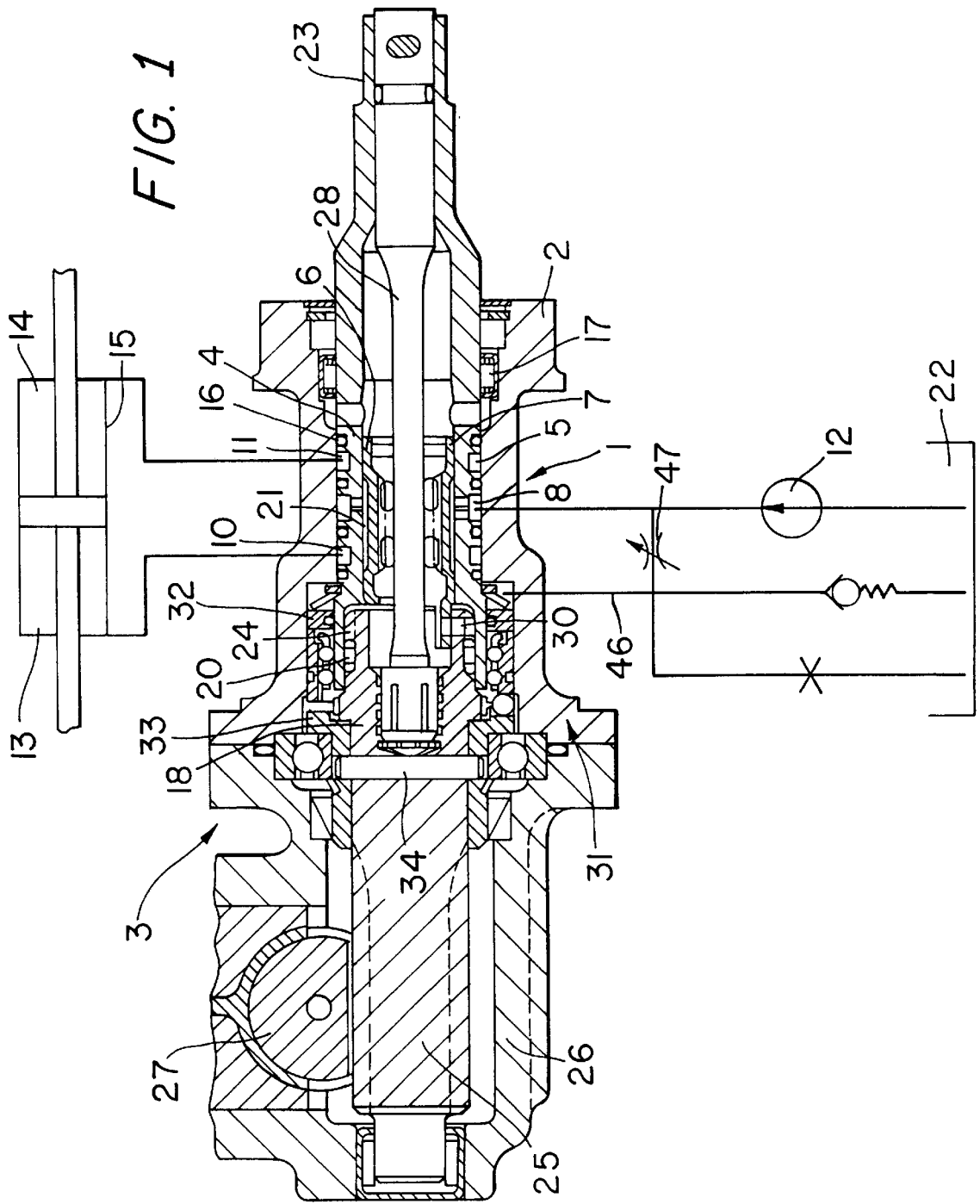
FIG. 1, a longitudinal section through the rotary slide valve in accordance with the invention with an associated steering gear shown schematically.
Figure 2:
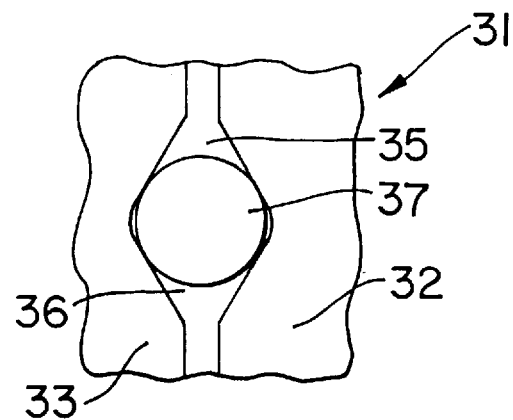
FIG. 2, a top view on the centering device in accordance with the arrow II in FIG. 1.
Figure 3:
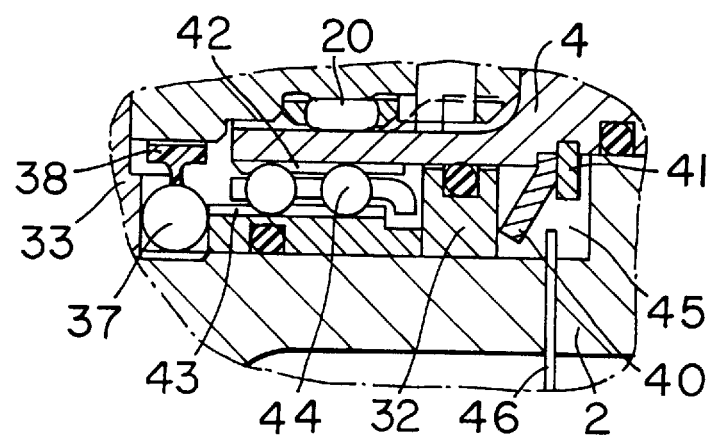
FIG. 3, the detail III in FIG. 1 in an enlarged scale.

A rotary slide valve 1 is contained in a valve housing 2 of a power steering 3.

The rotary slide valve 1 contains a first valve element in the form of a rotary distributor 4, which is rotatably guided in a valve 1 bore 5 of the valve housing 2. The rotary distributor 4 has an axial bore 6, in which a second valve element in the form of a control bushing 7 is rotatably guided. Thus, the rotary distributor 4 is situated radially on the outside, while the control bushing 7 is located radially on the inside.

On its exterior surface the rotary distributor 4 has annular grooves 8, 10, 11, to which a servo pump 12 and two work chambers 13 and 14 of a servo motor 15 are connected. The annular grooves 8, 10, 11 are sealed against the valve bore 5 by seal rings 16. The rotary distributor 4 is seated in the valve housing 2 by means of a roller bearing 17, and on a valve outlet member 18 by means of a roller bearing 19. The rotary distributor 4 has longitudinal control ports, not shown, in its axial bore 6, which are limited in their axial length and which cooperate with longitudinal control ports 21 disposed on the outer surface of the control bushing 7. A part of the longitudinal control ports 21 is closed in the direction of both ends of the control bushing 7. Some of the longitudinal control ports 21 are open in the direction of one end of the control bushing 7 and are connected with a pressure medium container 22, from which the servo pump 12 aspirates pressure medium.

The rotary distributor 4 is fixedly connected to prevent relative rotation, with a valve inlet member 23, which is embodied as a steering shaft connector. For example, the steering shaft connector is connected with a steering shaft, not shown, via a universal joint, also not shown. Furthermore, the rotary distributor 4 is connected via a backlash coupling 24 with the valve outlet member 18. The backlash coupling 24 consists, for example, of interior teeth on the rotary distributor 4 and exterior teeth on the valve outlet member 18. The valve outlet member 18 simultaneously constitutes an inlet member for the mechanical portion of the power steering 3 and is connected with a pinion 25, for example. The pinion 25 is rotatably seated in a steering housing 26 and cooperates with a toothed rack 27, which is axially displaceable and guided in the steering housing 26.

The rotary distributor 4 is furthermore connected via a torsion bar 28 with the valve outlet member 18. For its part, the valve outlet member 18 is fixedly connected to prevent relative rotation, via a stud 30 with the control bushing 7, whose other end is received in an axial bore of the valve outlet member 18.

Limited rotation between the rotary distributor 4 and the control bushing 7 is possible by means of these different connections. The pressure medium conveyed by the servo pump 12 is supplied by this rotation between the two valve elements to the respective work chamber 13 or 14 of the servo motor 15, and is conducted back into the pressure medium container 22 from the other work chamber 14 or 13, respectively.

A centering device 31, which contains two elements which are rotatable with respect to each other, is disposed between the rotary distributor 4 and the valve outlet member 18. The one part is fixedly connected with a reaction piston 32 or formed integrally with it. The reaction piston 32 can be made from one piece or assembled from several individual parts. The other element of the centering device 31 is embodied as a ring piece 33 and is fixedly connected with the valve outlet member 18 to prevent relative rotation and displacement. In the exemplary embodiment shown, the ring piece 33 is fastened to the valve outlet element 18 by means of a stud 34.

Respectively at least one recess 35 or 36 with oblique surfaces inclined in a V-shape toward each other is embodied on the front facing surfaces of the two parts of the centering device 31, i.e. on the reaction piston 32 and on the ring piece 33. A rolling body, in particular a ball 37, which is maintained in a plastic cage 38, is inserted between the two recesses 35 and 36. The two elements of the centering device 31 are pushed together by a spring 40, which is embodied as a form spring in the manner of a plate spring. The spring 40 acts on the reaction piston 32 and is supported on a stop 41 disposed on the rotary distributor 4. The stop 41 is constituted by a snap ring, for example.

On its exterior circumferential surface the rotary distributor 4 has longitudinal grooves 42, and the reaction cylinder 32 has longitudinal grooves on its interior circumferential surface which, together with balls 44 situated between the longitudinal grooves 42 and 43, form a longitudinal guide between the rotary distributor 4 and the reaction piston 32. The reaction piston 32 is fixedly connected to prevent relative rotation, with the rotary distributor 4 by means of this longitudinal guide. However, the reaction piston 32 can be displaced in the axial direction almost friction-free in respect to the rotary distributor 4.

The rotary slide valve in accordance with the invention described so far can be provided in a simple manner with a hydraulic reaction in addition to its mechanical centering. The hydraulic reaction effect is generated in that a steering force-dependent servo pressure can be fed through a line 46 into a chamber 45 which adjoins the reaction piston 32 and contains the spring 40. When needed, this servo pressure can be changed as a function of the driving speed. This is achieved, for example, in that the pressure medium conveyed by the servo pump 12, is supplied to the line 46 via a throttle 47, which is adjustable as a function of the driving speed. At low driving speed the throttle 47 is almost closed, so that only a relatively low reaction pressure prevails in the chamber 45: only a relatively slight manual force on the steering wheel is required for displacing the rotary slide valve. At high driving speed, however, the throttle 47 is wide open, so that the full servo pressure can act in the chamber 45. This increased reaction force on the reaction piston 32 must be overcome by the driver by increased use of force on the steering wheel: the driver retains a good "steering feel".

As already mentioned, it is intended by means of the present invention to provide the opportunity of designing the centering device so that it is easily adjustable with respect to centering force and the exact center position. The centering device 31 is set by means of the following assembly process of the rotary slide valve 1: first the rotary distributor 4 and the control bushing 7 are fixedly connected with each other at their hydraulic center by means of the torsion bar 28. Then the spring 40 and the reaction piston 32 are pushed on the rotary distributor 4, the ball 37 maintained in the plastic cage 37 is inserted into the V-shaped recess 35 of the reaction piston 32. Subsequently the V-shaped recess 36 of the ring piece 33 is aligned with the ball 37 and presses against the spring 40 with a predetermined force. In this predetermined position, in which the size of the centering force and the mechanical center position are exactly correct, the ring piece 33 is fixedly connected with the valve outlet member 18. This connection is suitably provided by drilling the ring piece 33 and the valve outlet member 18 together in a predetermined position and firmly connecting them by means of the stud 34.

I claim:

1. A rotary slide valve for the power steering of motor vehicles, comprising a first valve element, which is fixedly connected to a valve inlet member to prevent relative rotation between the first valve element and the valve inlet member, and a second valve element, which is fixedly connected to a valve outlet member to prevent relative rotation between the second valve element and the valve outlet member, the first valve element is a rotary distributor (4) having an axial bore and is connected to the valve outlet member via a torsion bar and a backlash coupling and the rotary distributor has a circumferential outer surface, the second valve element is situated radially inside the axial bore of the rotary distributor and is guided as a control bushing, the two valve elements are arranged to be coaxially movable inside each other and are located in a valve housing and the two elements can be rotated in relation to each other to a maximum of the rotational travel path of a backlash coupling, and wherein the rotary distributor has longitudinal control sorts on its interior and the control bushing has longitudinal control ports on its exterior, which exterior ports are limited in their axial length and cooperate in the control of a pressure medium to and from two work chambers of a servo motor, a centering device is disposed between the rotary distributor and the valve outlet member, the improvement comprising:

the centering device contains two parts, which can be rotated in respect to each other, and at least one ball located between the two parts, the first part is fixedly connected to a reaction piston having a circumferential interior surface, and is fixedly connected to the rotary distributor to prevent relative rotation between the first part and the rotary distributor and permit axial displacement of the first part, the second part is fixedly connected to the valve outlet member in a predetermined position to prevent relative rotation between the second part and the valve outlet member and the second part is not axially displaceable, each of the first and second parts includes a recess which together form a recess of the two parts;

the ball is maintained in a recess of the two parts, and a spring having two ends acts on the reaction piston, which spring is supported at the one end on the reaction piston and at the other end on a stop disposed on the rotary distributor.

2. The rotary slide valve in accordance with claim 1, wherein the second part is a ring piece.

3. The rotary slide valve in accordance with claim 2, wherein the ring piece is fixedly connected with the valve outlet member in a predetermined position.

4. The rotary slide valve in accordance with claim 2, wherein each of the recesses (35, 36) of the first and second parts each have an oblique surface and wherein both of these oblique surfaces are inclined toward each other to form a V-shape.

5. The rotary slide valve in accordance with claim 4, wherein the ball is maintained in a plastic cage.

6. The rotary slide valve in accordance with claim 1, wherein the spring is shaped in the manner of a plate spring.

7. The rotary slide valve in accordance with claim 1 further comprising balls and having longitudinal grooves arranged on the exterior circumferential surface of the rotary distributor and on the interior circumferential surface of the reaction piston which, together with the balls located between the longitudinal grooves, form a longitudinal guide between the rotary distributor and the reaction piston.

8. A method for mounting the rotary slide valve as claimed in claim 1, comprising the steps of:

fixedly connecting the rotary distributor with the valve inlet member;

fixedly connecting the control bushing with the valve outlet member at a hydraulic center of the control bushing and valve outlet member;

pushing the spring onto the rotary distributors;

pushing the reaction piston onto the rotary distributor;

inserting the ball maintained in a plastic cage into the recess of the reaction piston;

aligning the second part with the recess in respect to the ball and pushing the second part against the spring with a predetermined force; and fixedly connecting the second part to the valve outlet member in the predetermined position resulting from pushing the second part against the spring with a predetermined force.

9. The method in accordance with claim 8, wherein the second part is a ring piece and the ring piece and valve outlet member are placed in a predetermined position, simultaneously drilled, and fixedly connected to one another by a stud placed in a hole resulting from the drilling step.

* * * * *